United States Patent
Igarashi et al.

(10) Patent No.: US 8,380,456 B2
(45) Date of Patent: Feb. 19, 2013

(54) JIG, METHOD AND DATA GENERATING APPARATUS FOR CALIBRATING SPECTACLE FRAME SHAPE MEASURING APPARATUS, SPECTACLE FRAME SHAPE MEASURING APPARATUS AND SPECTACLE FRAME SHAPE MEASURING CALIBRATING SYSTEM

(75) Inventors: Takashi Igarashi, Akishima (JP); Masahiro Jinbo, Akirono (JP); Ryousuke Satoh, Koganei (JP)

(73) Assignee: Hoya Corporation, Tokyo (JP)

( * ) Notice: Subject to any disclaimer, the term of this patent is extended or adjusted under 35 U.S.C. 154(b) by 590 days.

(21) Appl. No.: 12/449,825

(22) PCT Filed: Feb. 28, 2007

(86) PCT No.: PCT/JP2007/053828
§ 371 (c)(1),
(2), (4) Date: Oct. 7, 2009

(87) PCT Pub. No.: WO2008/105096
PCT Pub. Date: Sep. 4, 2008

(65) Prior Publication Data
US 2010/0088056 A1  Apr. 8, 2010

(51) Int. Cl.
*G01P 21/00* (2006.01)
*A61B 3/10* (2006.01)

(52) U.S. Cl. .......................................... 702/95; 33/200

(58) Field of Classification Search .................. 702/95, 702/33–36, 42–43, 81, 84–85, 97, 127, 150–158, 702/166–168, 170, 182–183, 189; 33/200, 33/502–504, 507, 556, 559–560; 73/1.75, 73/1.79, 1.81, 104
See application file for complete search history.

(56) References Cited

U.S. PATENT DOCUMENTS

| | | | |
|---|---|---|---|
| 5,450,335 A * | 9/1995 | Kikuchi | 702/168 |
| 5,615,486 A * | 4/1997 | Igarashi et al. | 33/200 |
| 5,802,731 A | 9/1998 | Guillermin et al. | |
| 2009/0222122 A1* | 9/2009 | Daimaru et al. | 700/98 |

FOREIGN PATENT DOCUMENTS

| JP | A-4-13539 | 1/1992 |
|---|---|---|
| JP | A-9-105890 | 4/1997 |
| JP | A-2003-172906 | 6/2003 |

* cited by examiner

Primary Examiner — Toan Le
(74) Attorney, Agent, or Firm — Oliff & Berridge, PLC

(57) ABSTRACT

To provide a calibration jig which can perform three-dimensional calibration of measurement errors in a spectacle frame shape measuring apparatus. The calibration jig is used for calibrating measurement errors of the spectacle frame shape measuring apparatus for measuring a shape of a spectacle frame, etc. A trace groove traced by a measuring probe of the spectacle frame shape measuring apparatus is a frame groove formed in an inner circumference of rims of the spectacle frame and provided for engaging with the bevel of a spectacle lens. The rims are secured to a frame body having rigidity higher than that of the rim. The frame groove has a displacement r in the radial direction, a displacement θ in the rotational direction, and a displacement z in the height direction.

21 Claims, 9 Drawing Sheets

JIG, METHOD AND DATA GENERATING APPARATUS FOR CALIBRATING SPECTACLE FRAME SHAPE MEASURING APPARATUS, SPECTACLE FRAME SHAPE MEASURING APPARATUS AND SPECTACLE FRAME SHAPE MEASURING CALIBRATING SYSTEM

TECHNICAL FIELD

The present invention relates to a calibration jig used for calibrating measurement errors of a spectacle frame shape measuring apparatus, a calibration method for a spectacle frame shape measuring apparatus by the calibration jig, a calibration data generating apparatus for calibrating measurement errors of a spectacle frame shape measuring apparatus, a spectacle frame shape measuring apparatus having the function of generating calibration data, and a spectacle frame shape measuring calibrating system having the functions of measuring a spectacle frame shape and generating calibration data.

BACKGROUND ART

In a spectacle frame shape measuring apparatus for measuring a shape of a spectacle frame, etc., a measurement error is generated due to long-term use, and such a measurement error is generally calibrated by using a calibration jig.

Such a calibration jig (reference frame) 100 is described in Patent Document 1, and as shown in FIG. 9, reference holes 102 being through holes are formed through a metal plate 101 of the calibration jig corresponding to the plan-view shape of rims of a spectacle frame. The inner circumferential surfaces 103 of the reference hole 102 is traced with the tip portion of a measuring probe 104 of a spectacle frame shape measuring apparatus being a measurement object, with the tip portion of the measuring probe 104 kept in contact with the inner circumferential surfaces 103. A measurement error of the spectacle frame shape measuring apparatus being a measurement object is calculated by comparing measurement data measured by the way in which the measuring probe 104 of the spectacle frame measuring apparatus being a measurement object traces the inner circumferential surface 103 of the reference hole 102 in the calibration jig 100 with reference data obtained in advance by accurate measurement of the inner circumferential surface 103 of the reference hole 102 in the calibration jig 100.

Patent Document 1: Unexamined Japanese Patent Application Publication No. H4-13539

DISCLOSURE OF INVENTION

Problem to be Solved by the Invention

Incidentally, the shape of rims of a spectacle frame is formed into a three-dimensional shape according to the shape of the face of a spectacle wearer, however, the measurement data of the inner circumferential surfaces 103 of the reference holes 102 of the calibration jig 100, being measured by the spectacle frame shape measuring apparatus, is two-dimensional measurement data. In other words, the measurement data of the inner circumferential surfaces 103 is expressed by a displacement r in the radial direction and a displacement θ in the rotational direction. Thus, calibration of measurement errors of a spectacle frame shape measuring apparatus by such a calibration jig 100 allows two-dimensional calibration as described above, but not three-dimensional calibration including a displacement in the height direction.

In consideration of the circumstances described above, an object of the present invention is to provide a calibration jig, a calibration method, and a calibration data generating apparatus for a spectacle frame shape measuring apparatus, a spectacle frame shape measuring apparatus, and a spectacle frame shape measuring calibrating system which can perform three-dimensional calibration of measurement errors in the spectacle frame shape measuring apparatus.

Means for Solving the Problem

A calibration jig according to a first invention is a calibration jig used for calibrating measurement errors of a spectacle frame shape measuring apparatus measuring a shape of a spectacle frame or the like by a measuring probe, wherein the calibration jig has a trace groove displaced in a radial direction, a rotational direction, and a height direction so as to be traced by the measuring probe of the spectacle frame shape measuring apparatus.

A calibration jig according to a second invention is the calibration jig according to the first invention, wherein the trace groove is formed in an inner circumferential surface of a hole formed in a plate-like body.

A calibration jig according to a third invention is the calibration jig according to the first invention, wherein the trace groove is formed in an inner circumference of a rim, and the rim is secured to a frame body having rigidity higher than that of the rim.

A calibration jig according to a fourth invention is the calibration jig according to the third invention, wherein the frame body has a planar face having an opening provided correspondingly to a pair of rims and upright portions placed upright from both sides of the planar face, an upper portion and a lower portion of the rims are adhered to edge portions facing the opening of the planar face, and endpieces of the rims are adhered to the upright portions.

A calibration jig according to a fifth invention is the calibration jig according to any one of the first to fourth inventions, wherein the trace groove has regulating surfaces regulating the tip portion of the measuring probe by contacting both substantially opposite portions of the tip portion of the measuring probe with the trace groove.

A calibration method for calibrating a spectacle frame shape measuring apparatus according to a sixth invention is a calibration method for calibrating measurement errors of a spectacle frame shape measuring apparatus, by using a calibration jig, measuring a shape of a spectacle frame by a measuring probe, with the calibration jig having a trace groove displaced in a radial direction, a rotational direction, and a height direction, so as to be traced by the measuring probe, the calibration method including steps of:

measuring a three-dimensional shape of the trace groove by tracing the trace groove with the measuring probe kept in contact with the trace groove;

calculating a correction value for correcting a height displacement of three-dimensional shape data so that a height displacement width calculated based on the three-dimensional shape data obtained by measurement coincides with a reference height displacement width determined based on reference three-dimensional shape data obtained by measuring the trace groove in advance;

calculating the circumferential length of the trace groove based on three-dimensional shape data with the height displacement corrected by the calculated height displacement correction value;

calculating a correction value for correcting a radial displacement of the three-dimensional shape data with the height displacement corrected so that the calculated circumferential length coincides with a reference circumferential length determined based on the reference three-dimensional shape data; and calibrating a measurement error of the spectacle frame shape measuring apparatus based on the height displacement correction value and the radial displacement correction value.

A calibration data generating apparatus according to a seventh invention is a calibration data generating apparatus for generating calibration data for calibrating a measurement error of a spectacle frame shape measuring apparatus, by using a calibration jig, measuring a shape of a spectacle frame by a measuring probe, with the calibration jig having a trace groove displaced in a radial direction, a rotational direction, and a height direction so as to be traced by the measuring probe, having:

a first correction value calculating part for calculating a correction value for correcting a height displacement in three-dimensional shape data obtained by tracing the trace groove with the measuring probe kept in contact with the trace groove and by measuring a three-dimensional shape of the trace groove of the calibration jig, so that a height displacement width calculated based on the three-dimensional shape data obtained by measurement coincides with a reference height displacement width determined based on reference three-dimensional shape data obtained by measuring the trace groove in advance;

a circumferential length calculating part for calculating the circumferential length of the trace groove based on three-dimensional shape data with the height displacement corrected by the calculated height displacement correction value;

a second correction value calculating part for calculating a correction value for correcting a radial displacement in the three-dimensional shape data with the height displacement corrected so that the calculated circumferential length coincides with a reference circumferential length determined based on the reference three-dimensional shape data; and a calibration data generating part for generating calibration data for calibrating measurement errors of the spectacle frame shape measuring apparatus based on the height displacement correction value and the radial displacement correction value.

A spectacle frame shape measuring apparatus according to an eighth invention has:

a spectacle frame shape measuring part measuring a shape of a spectacle frame by a measuring probe; and a calibration data generating part for generating calibration data for calibrating a measurement error of the spectacle frame shape measuring part, by using a calibration jig, with the calibration jig having a trace groove displaced in a radial direction, a rotational direction, and a height direction so as to be traced by the measuring probe, the calibration data generating part including:

a first correction value calculating part for calculating a correction value for correcting a height displacement in three-dimensional shape data obtained by tracing the trace groove with the measuring probe kept in contact with the trace groove and by measuring a three-dimensional shape of the trace groove of the calibration jig, so that a height displacement width calculated based on the three-dimensional shape data obtained by measurement coincides with a reference height displacement width determined based on reference three-dimensional shape data obtained by measuring the trace groove in advance;

a circumferential length calculating part for calculating the circumferential length of the trace groove based on three-dimensional shape data with the height displacement corrected by the calculated height displacement correction value;

a second correction value calculating part for calculating a correction value for correcting a radial displacement of the three-dimensional shape data with the height displacement corrected so that the calculated circumferential length coincides with a reference circumferential length determined based on the reference three-dimensional shape data; and a calibration data generating part for generating calibration data for calibrating a measurement error of the spectacle frame shape measuring apparatus based on the height displacement correction value and the radial displacement correction value.

A spectacle frame shape measuring calibrating system according to a ninth invention has:

a spectacle frame shape measuring apparatus measuring a shape of a spectacle frame by a measuring probe; and a calibration data generating apparatus for generating calibration data for calibrating a measurement error of the spectacle frame shape measuring part, by using a calibration jig, with the calibration jig having a trace groove displaced in a radial direction, a rotational direction, and a height direction, so as to be traced by the measuring probe, the calibration data generating apparatus including:

a first correction value calculating part for calculating a correction value for correcting a height displacement in three-dimensional shape data obtained by tracing the trace groove with the measuring probe kept in contact with the trace groove and by measuring a three-dimensional shape of the trace groove of the calibration jig, so that a height displacement width calculated based on the three-dimensional shape data obtained by measurement coincides with a reference height displacement width determined based on reference three-dimensional shape data obtained by measuring of the trace groove in advance;

a circumferential length calculating part for calculating the circumferential length of the trace groove based on three-dimensional shape data with the height displacement corrected by the calculated height displacement correction value;

a second correction value calculating part for calculating a correction value for correcting a radial displacement of the three-dimensional shape data with the height displacement corrected so that the calculated circumferential length coincides with a reference circumferential length determined based on the reference three-dimensional shape data; and a calibration data generating part for generating calibration data for calibrating a measurement error of the spectacle frame shape measuring apparatus based on the height displacement correction value and the radial displacement correction value.

Advantages

According to the first to third inventions, the trace groove being traced with the measuring probe of the spectacle frame shape measuring apparatus is formed in the calibration jig so as to be displaced in the radial direction, rotational direction, and height direction. This can allow three-dimensional calibration of measurement errors caused by the spectacle frame shape measuring apparatus by the calibration jig, thus achieving accurate calibration.

According to the fourth invention, the upper portion and lower portion of the rim of the spectacle frame are adhered to edge portions facing the openings formed in the planar face of the frame body, and the endpieces of the rims are adhered to the upright portion of the frame body, making it possible to reinforce the rims with the frame body without deforming them.

According to the fifth invention, the trace groove has regulating surfaces which regulate the tip portion of the measuring probe by contacting both substantially opposite portions of the tip portion of the measuring probe with the trace groove. Thus, the measuring probe can move along the trace groove while being always in contact with the regulating surfaces without disengaging from the trace groove, therefore ensuring the accuracy of calibration by the calibration jig.

According to the sixth to ninth inventions, measurement errors of the spectacle frame shape measuring apparatus are calibrated so that the circumferential length and height displacement width based on data measured by the calibration jig coincide with a reference circumferential length and a reference height displacement width, allowing for three-dimensional calibration and, accordingly, accurate calibration.

BRIEF DESCRIPTION OF THE DRAWINGS

FIG. 1(A) is a front view, FIG. 1(B) is a view from the direction of arrow B in FIG. 1(A), and FIG. 1(C) is a view from the direction of arrow C in FIG. 1(A).

FIG. 7(A) is a front view, FIG. 7(B) is a view from the direction of arrow B in FIG. 7(A), and FIG. 7(C) is a view from the direction of arrow C in FIG. 7(A).

FIG. 9(A) is a front view, and FIG. 9(B) is a cross-sectional view taken along line IX-IX in FIG. 9(A).

FIG. 10(A) is a front view, FIG. 10(B) is a view from the direction of arrow B in FIG. 10(A), and FIG. 10(C) is a view from the direction of arrow C in FIG. 10(A).

BEST MODE FOR CARRYING OUT THE INVENTION

Hereinafter, the best mode for carrying out the present invention will be described with reference to the drawings.

[A] First Embodiment

FIGS. 1 to 6

Figure 1:
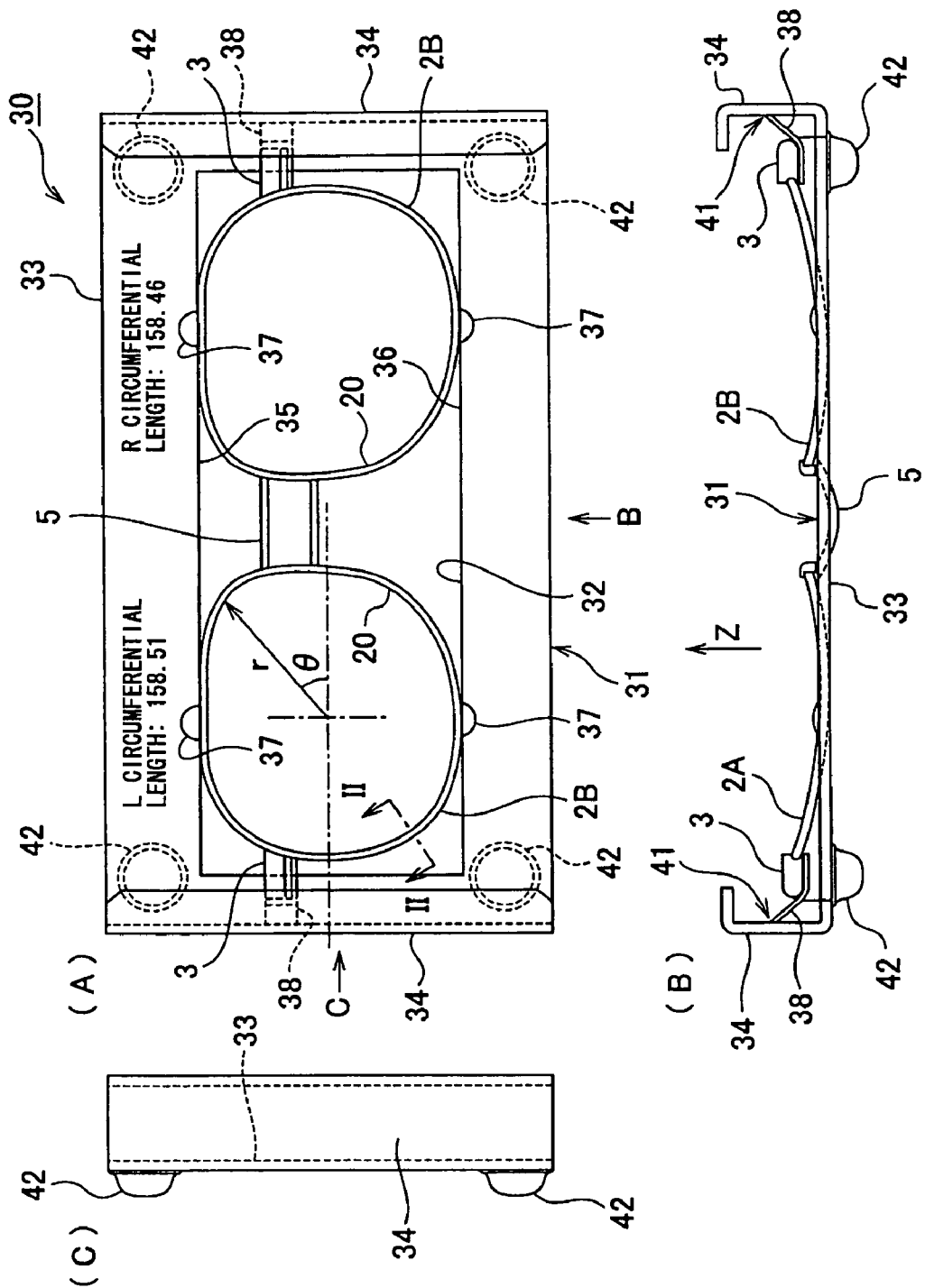
FIG. 1 shows a first embodiment of a calibration jig according to the present invention for a spectacle frame shape measuring apparatus.
Figure 4:
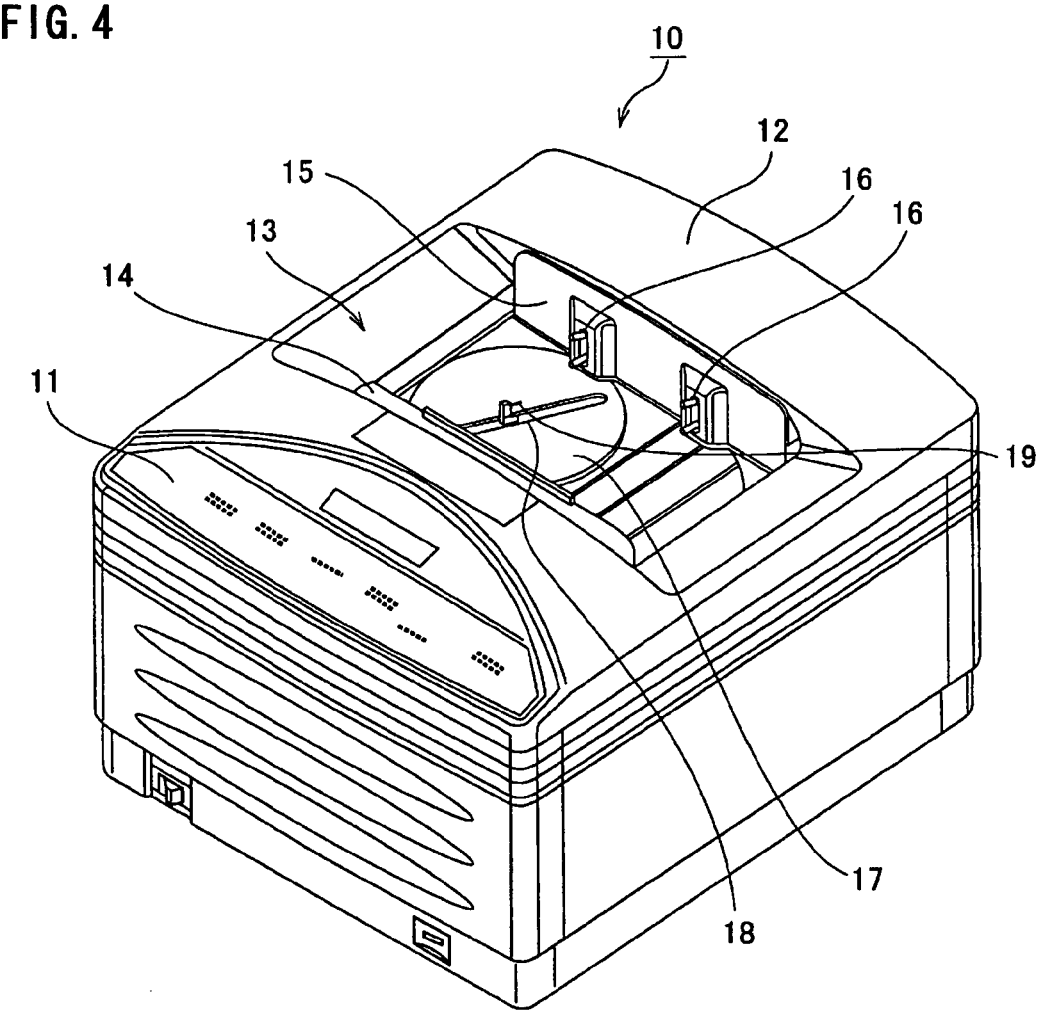
FIG. 4 is a perspective view showing the spectacle frame shape measuring apparatus as viewed from the front.

FIG. 1 shows a first embodiment of a calibration jig according to the present invention for a spectacle frame shape measuring apparatus; FIG. 1(A) is a front view, FIG. 1(B) is a view from the direction of arrow B in FIG. 1(A), and FIG. 1(C) is a view from the direction of arrow C in FIG. 1(A). FIG. 4 is a perspective view of the spectacle frame shape measuring apparatus as seen from the front, whereas FIG. 5 is a perspective view of a spectacle frame shape measuring apparatus as seen from the back.

Figure 5:
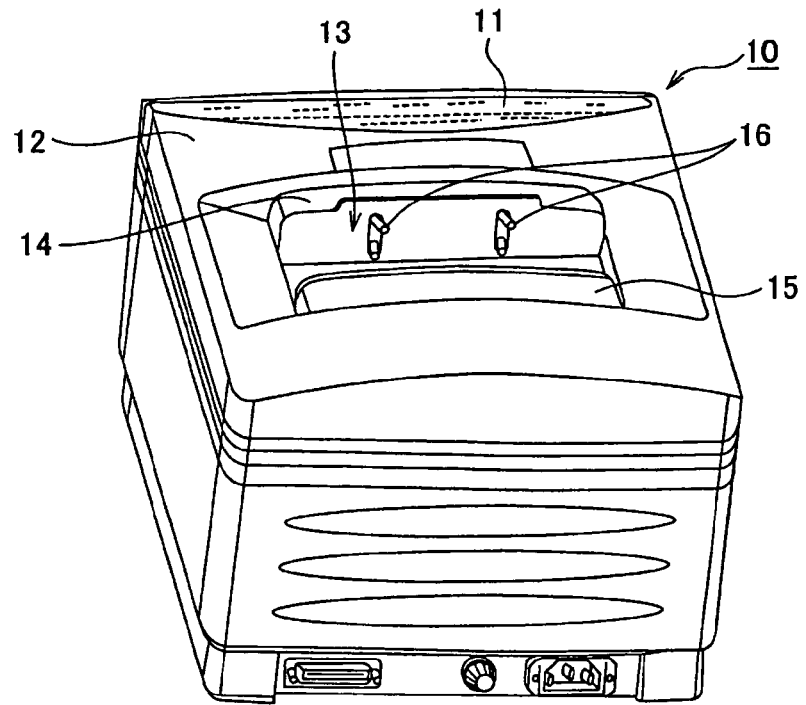
FIG. 5 is a perspective view showing the spectacle frame shape measuring apparatus in FIG. 4 as viewed from the back.

A spectacle frame shape measuring apparatus 10 shown in FIGS. 4 and 5 measures the shape of left and right rims 2A and 2B of a spectacle frame 1 (FIG. 6), the shape of a frame template not illustrated, or the circumferential shape of a spectacle lens not illustrated, and has an opening 13 formed in the center of an upper cover 12 having a control panel 11 provided at the front. This opening 13 accommodates a measurement target, namely, the spectacle frame 1, a frame template or a spectacle lens.

In the opening 13, a front stopper 14 is arranged at the front side of the spectacle frame shape measuring apparatus 10 and a rear stopper 15 is arranged at the rear side thereof, respectively, so as to be movable toward or away from each other. Each of the stoppers 14 and 15 has plural pairs (e.g., two pairs) of clamp pins 16 for holding and positioning a measurement target (e.g., spectacle frame or calibration jig).

Figure 6:
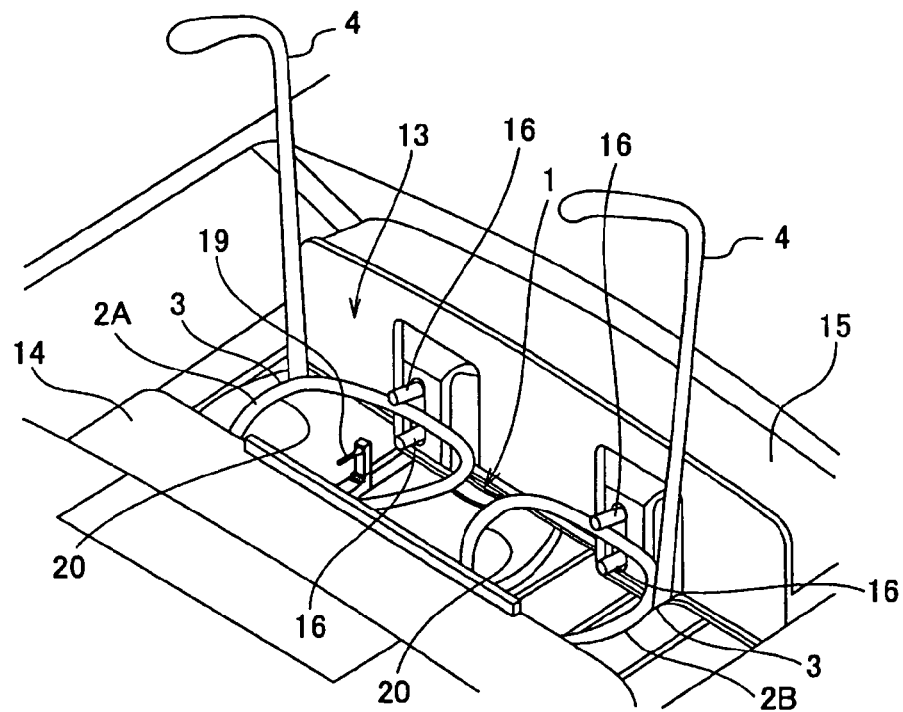
FIG. 6 is a perspective view showing a spectacle frame mounted on the spectacle frame shape measuring apparatus shown in FIGS. 4 and 5.

When the spectacle frame 1 is placed in the opening 13 by an operator, the front stopper 14 and the rear stopper 15 are likewise moved close to each other by the operator. Then, rims 2A and 2B of the spectacle frame 1 are positioned on the lower clamp pins 16 (FIG. 6). After the operator presses a start button (not illustrated) on the control panel 11, the upper and lower clamp pins 16 of the front stopper 14 and the rear stopper 15 hold the rims 2A and 2B, locking the positions of the stoppers 14 and 15 so that the spectacle frame 1 is mounted on the spectacle frame shape measuring apparatus 10.

Note that, the spectacle frame 1 is mounted on the spectacle frame shape measuring apparatus 10, with the rims 2A and 2B being positioned downward and temples 4 being rotatably supported at endpieces 3 of the rims 2A and 2B project upward.

As shown in FIG. 4, a turntable 17 driven to rotate is provided in the opening 13. The turntable 17 has a long groove 18 extending in the diametrical direction of the turntable 17, with a stylus 19 as a measuring probe disposed in the long groove 18. The stylus 19 is configured to be movable horizontally within the long groove 18 by means of a horizontal drive mechanism not illustrated, and movable upward or downward by means of a vertical drive mechanism not illustrated. The stylus 19 revolves in the horizontal plane by the rotation of the driven turntable 17.

After the spectacle frame 1 is mounted on the spectacle frame shape measuring apparatus 10 by the front stopper 14, rear stopper 15, and clamp pins 16 as described above (FIG. 6), the actions of the rotation drive mechanism of the turntable 17 and the horizontal and vertical drive mechanisms cause the stylus 19 to revolve by 360° with its tip portion pressed against a frame groove 20 formed in the inner circumferential surface of each of the rims 2A and 2B of the spectacle frame 1, thereby the stylus traces the frame grooves 20. The frame grooves 20 engage with the bevel of spectacle lenses not illustrated.

In general, the rims 2A and 2B of the spectacle frame 1 have a three-dimensional shape curved according to the shape of the face of a spectacle wearer. Thus, the stylus 19, which traces the frame groove 20 of each of the rims 2A and 2B, moves horizontally and up and down in the long groove 18 while the stylus is revolving along the frame groove. Therefore, the three-dimensional shape is measured due to detection of the angle of rotation, the amount of horizontal movement, and the amount of vertical movement of the stylus. The measurement data becomes cylindrical coordinate data expressed by a displacement r of the stylus 19 in the radial direction (horizontal direction), a displacement θ of the stylus 19 in the rotational direction in the horizontal plane, and a displacement z of the stylus 19 in the height direction (vertical direction). The shape of the rim 2A, 2B of the spectacle frame 1 is measured from the measurement data of these displacements r, θ, and z.

Note that the values r, θ, and z forming cylindrical coordinates, are measured for every predetermined increment of the rotational displacement r. Therefore, the three-dimensional shape measurement data is expressed as $(r_n, \theta_n, z_n)$ (n=1, 2, 3, ..., N). Note that N represents the number of times of measurement per revolution.

The measurement data r and θ of the shape of the frame template and the circumferential shape of the spectacle lens not illustrated are also measured by the stylus 19, and the shape of the frame template or the circumferential shape of the spectacle lens is measured from the measurement data r and θ.

Incidentally, measurement errors are generated due to long-term use, etc. in the spectacle frame shape measuring apparatus 10, and such measurement errors should be calibrated by the calibration jig 30 shown in FIG. 1. This calibration jig 30 has portions 2A and 2B corresponding to the rims of the spectacle frame (in this description, sometimes simply referred to as rims 2A and 2B) linked by a portion 5 corresponding to the bridge of the spectacle frame (in this description, sometimes simply referred to as bridge 5), and a frame body 31 for fixing and supporting the rims 2A and 2B. The frame body 31 is made of a metal plate having rigidity higher than that of the rims 2A and 2B, and has a rectangular outer shape as seen from the front.

The frame body 31 has a planar face 33 having an opening 32 and upright portions 34 placed upright from both sides of the left and right ends of the planar face 33. The opening 32 corresponds to a pair of rims 2A and 2B linked by the bridge 5, and for example has a rectangular shape which inscribes the rims 2A and 2B.

The upper portions and lower portions of the rims 2A and 2B are adhered to an upper edge 35 and lower edge 36 of the opening 32 formed in the planar face 33, respectively, by such as an adhesive 37. Also, portions 3 located on both outer sides of the rims 2A and 2B and equivalent to endpieces of the spectacle frame (in this description, sometimes simply referred to as endpieces 3) are adhered to the upright portions 34 via brackets 38 by such as welding. In this way, the rims 2A and 2B, linked by the bridge 5, are reinforced by secure fixation to the metal frame body 31, rigidity higher than that of the rims 2A and 2B. The numeral 41 in FIG. 1 represents welded portions, and the numeral 42 represents legs. A structure comprising the bridge 5, rims 2A and 2B, and endpieces 3 is hereinafter referred to as a spectacle frame equivalent portion or, simply, a spectacle frame portion.

In the calibration jig 30 configured as described above, the frame groove 20 of each of the rims 2A and 2B serves as a trace groove traced by the stylus 19 of the spectacle frame shape measuring apparatus 10. The frame groove 20 is formed in such a way that the radius and height change continuously in the rotational direction, thereby the rims 2A and 2B have a three-dimensional shape as described above, and the frame grooves 20 thus have a displacement r in the radial direction (FIG. 1(A)), a displacement θ in the rotational direction (FIG. 1(A)), and a displacement z in the height direction (FIG. 1(B)). These displacements r, θ, and z are measured in advance by such as an accurate spectacle frame shape measuring apparatus 10, a predetermined number of times (N) per revolution at a given angular interval. The obtained three-dimensional measurement data $(r_n, \theta_n, z_n)$ (n=1, 2, 3, ..., N) is then used as a reference value. The circumferential length of the frame groove 20 (trace groove) calculated from the reference value is displayed as a reference circumferential length on such as the planar face 33 of the frame body 31 of the calibration jig 30.

In this embodiment, the reference circumferential lengths of the frame grooves 20 of the rims 2A and 2B are displayed on the planar face 33 as "L circumferential length" and "R circumferential length," respectively. Note that, in this embodiment, portions of the planar face 33 which respectively lie above the rims 2A and 2B are defined as L circumferential length and R circumferential length display areas 43. It is further preferable that the reference value of the calibration jig 30 should be a value measured by the same stylus as that used in the spectacle frame shape measuring apparatus to be calibrated or a stylus having the same distal end shape as that of the stylus described above.

Figure 2:
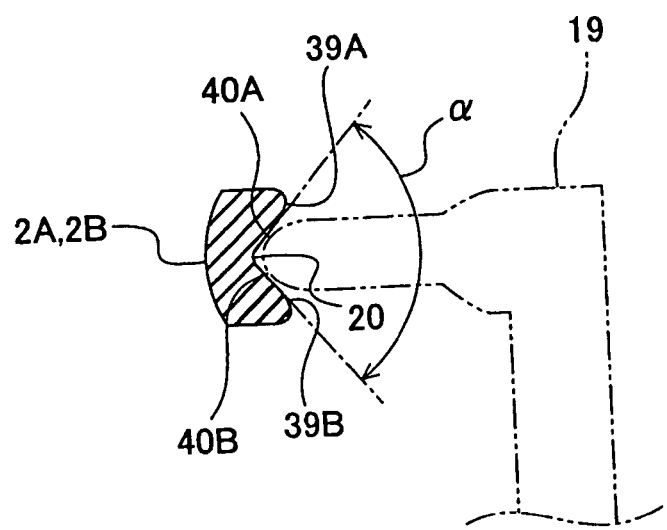
FIG. 2 is a cross-sectional view taken along line II-II in FIG. 1.

As shown in FIG. 2, the frame groove 20 serving as a trace groove, is an outward recessed groove and has substantially opposing inclined surfaces 39A and 39B at a predetermined angle α. Substantially opposite portions 40A and 40B of the tip portion of the stylus 19 respectively contact these inclined surfaces 39A and 39B so that the inclined surfaces 39A and 39B serve as regulating surfaces for regulating the tip portion of the stylus 19. In other words, even if the frame grooves 20 have the three-dimensional displacements r, θ, and z described above, the stylus 19 tracing the frame groove 20 contacts at least one of the inclined surfaces 39A and 39B of the frame groove 20 to be regulated, and is thus prevented from disengaging from the frame groove 20.

Figure 3:
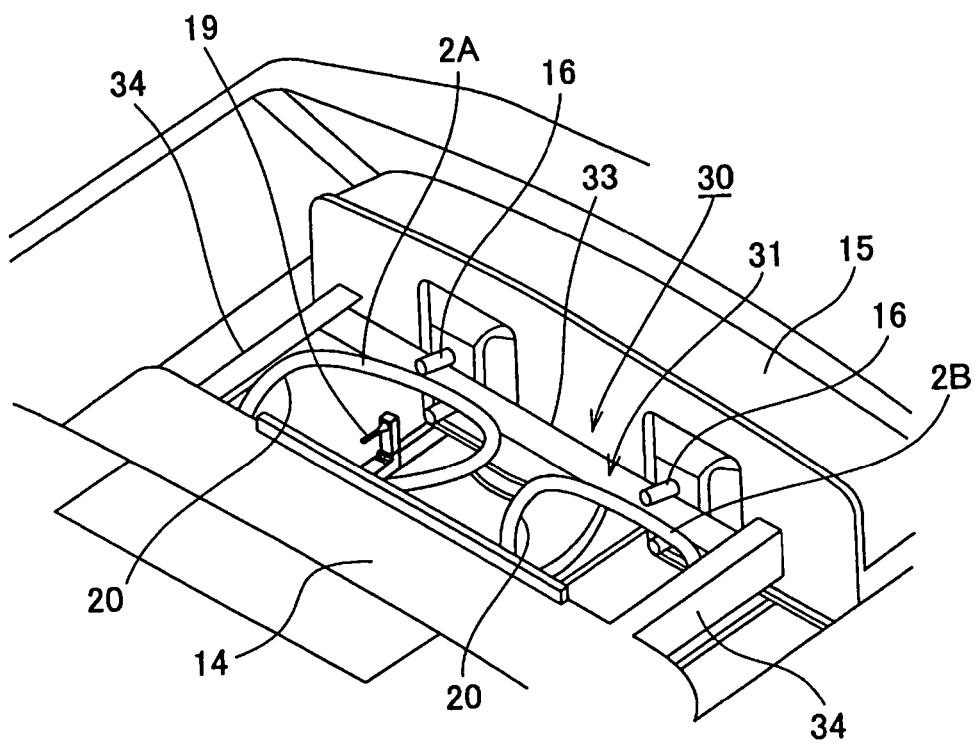
FIG. 3 is a perspective view showing the calibration jig shown in FIG. 1 mounted on a spectacle frame shape measuring apparatus.

The calibration jig 30 configured as described above is used to calibrate measurement errors of the spectacle frame shape measuring apparatus 10 being a measurement object. The calibration jig 30 is mounted on the spectacle frame shape measuring apparatus 10 being a measurement object as shown in FIG. 3. That is, as in a case of mounting the spectacle frame 1, when the calibration jig 30 is placed in the opening 13 of the spectacle frame shape measuring apparatus 10 being a measurement object, between the front stopper 14 and the rear stopper 15, the front stopper 14 and the rear stopper 15 are brought close to each other. This causes the upper and lower outer portions of the planar face 33 of the calibration jig 30 to be mounted on the respective lower clamp pins 16. As the operator presses a start button (not illustrated) on the control panel 11 thereafter, the upper and lower clamp pins 16 of the front stopper 14 and the rear stopper 15 hold the upper and lower outer portions, locking the positions of the stoppers 14 and 15, the calibration jig 30 is mounted on the spectacle frame shape measuring apparatus 10. Note that, in this embodiment, when the calibration jig 30 is mounted on the spectacle frame shape measuring apparatus 10, with the rims 2A and 2B positioned downward and the upright portions 34 positioned upward.

In this state, the spectacle frame shape measuring apparatus 10 being a measurement object causes the stylus 19 to trace the frame groove 20 in the rim 2A, 2B of the calibration jig 30, then the three-dimensional displacements (r, θ, and z) of the frame groove 20 are measured by a predetermined number of times (N) per revolution at a given angular interval. The circumferential length of the frame groove 20 is calculated and measured from the three-dimensional measurement data $(r_n, θ_n, z_n)$ (n=1, 2, 3, ..., N). The operator adjusts the spectacle frame shape measuring apparatus 10 being a measurement object, so that the difference between the measured circumferential length of the frame groove 20 and the reference circumferential length displayed on the calibration jig 30 is eliminated, thereby effecting calibration of the spectacle frame shape measuring apparatus 10 being a measurement object.

The foregoing embodiment configured as described above offers the following advantages (1) to (3):

(1) The calibration jig 30 is configured to have the rims 2A and 2B adhered to the frame body 31, and the frame grooves 20 of the rims 2A and 2B serve as the trace grooves that are traced with the stylus 19 of the spectacle frame shape measuring apparatus 10, and respectively have the displacement r in the radial direction, the displacement θ in the rotational direction, and the displacement z in the height direction. Thus, it is possible to carry out three-dimensional calibration of measurement errors of the spectacle frame shape measuring apparatus 10 by the calibration jig 30, thus achieving accurate calibration.

(2) In the calibration jig 30, the upper portions and lower portions of the rims 2A and 2B are adhered to the upper edge 35 and the lower edge 36 of the opening 32 formed in the planar face 33 of the frame body 31, and the endpieces 3 of the rims 2A and 2B are adhered to the upright portions 34 of the frame body 31; therefore, the rims 2A and 2B can be reinforced with the frame body 31 without deformation.

(3) The frame grooves 20 formed in the rims 2A and 2B of the calibration jig 30 respectively have the inclined surfaces 39A and 39B, which regulate the tip portion of the stylus 19 of the spectacle frame shape measuring apparatus 10 as substantially opposite portions 40A and 40B of the tip portion of the stylus 19 contact the inclined surfaces 39A and 39B. This enables the stylus 19 to move along the frame groove 20 while being kept in contact with both the inclined surfaces 39A and 39B without disengaging from the frame grooves 20, thus assuring accurate calibration by the calibration jig 30.

(4) The rims 2A and 2B of the calibration jig 30 can be produced in a way similar to that for spectacle frames or may be parts of the spectacle frames, thus facilitating manufacturing.

[B] Second Embodiment

Figure 7:
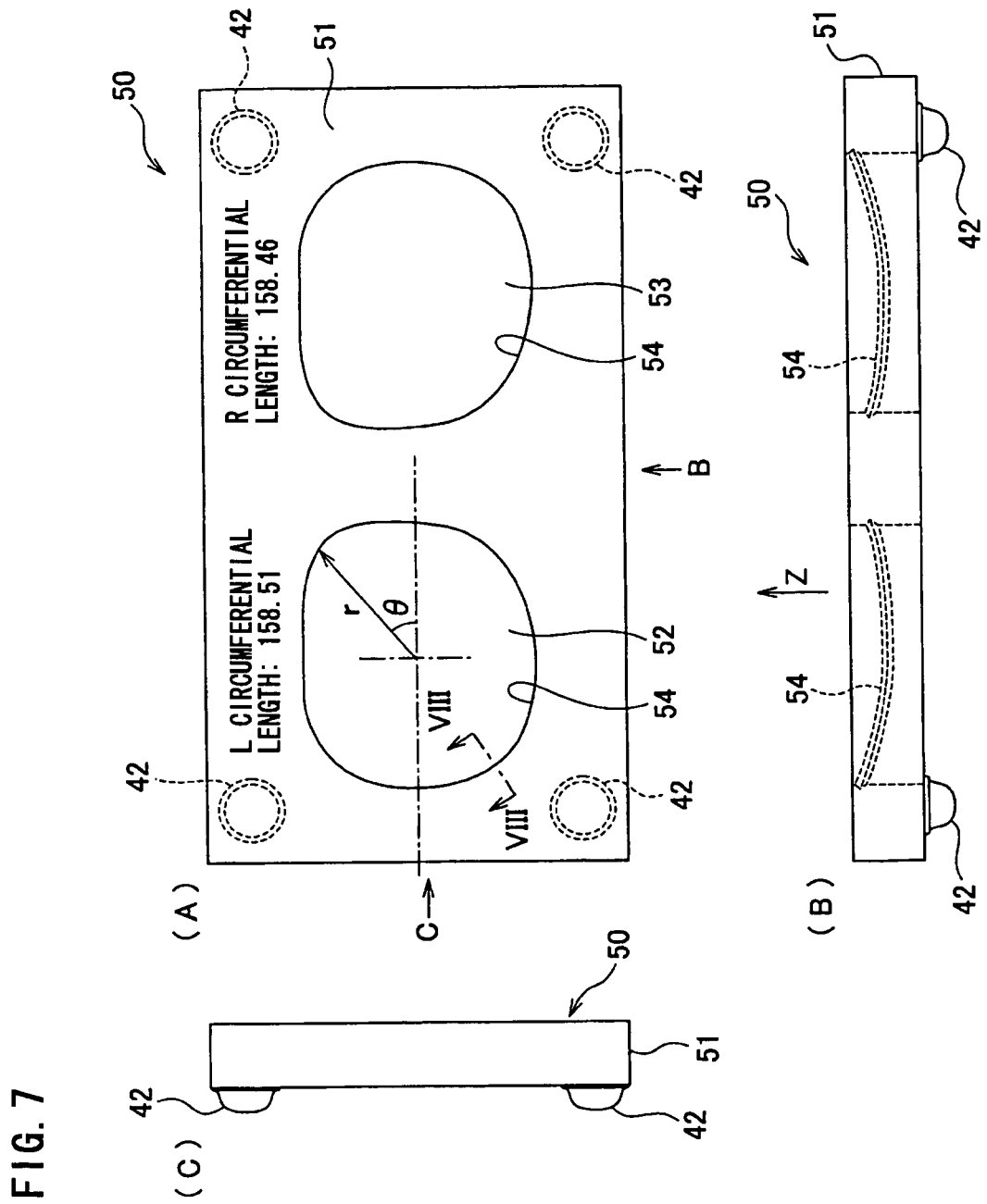
FIG. 7 shows a second embodiment of a calibration jig according to the present invention for a spectacle frame shape measuring apparatus.
Figure 8:
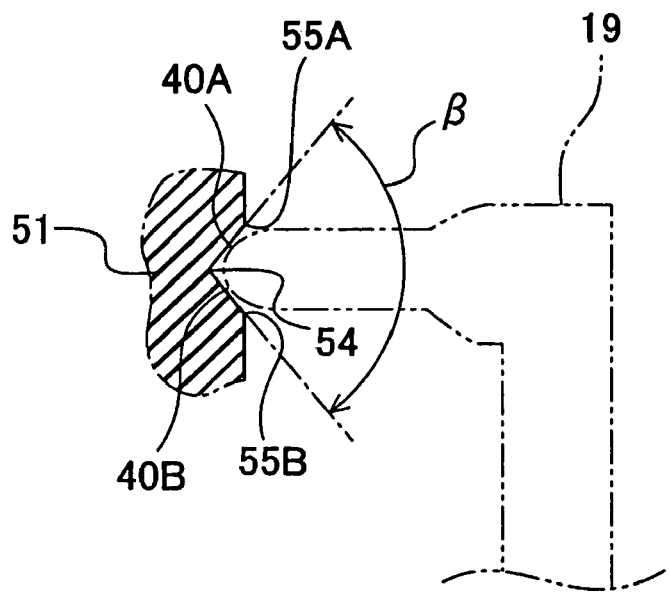
FIG. 8 is a cross-sectional view taken along line VIII-VIII in FIG. 7(A).
Figure 9:
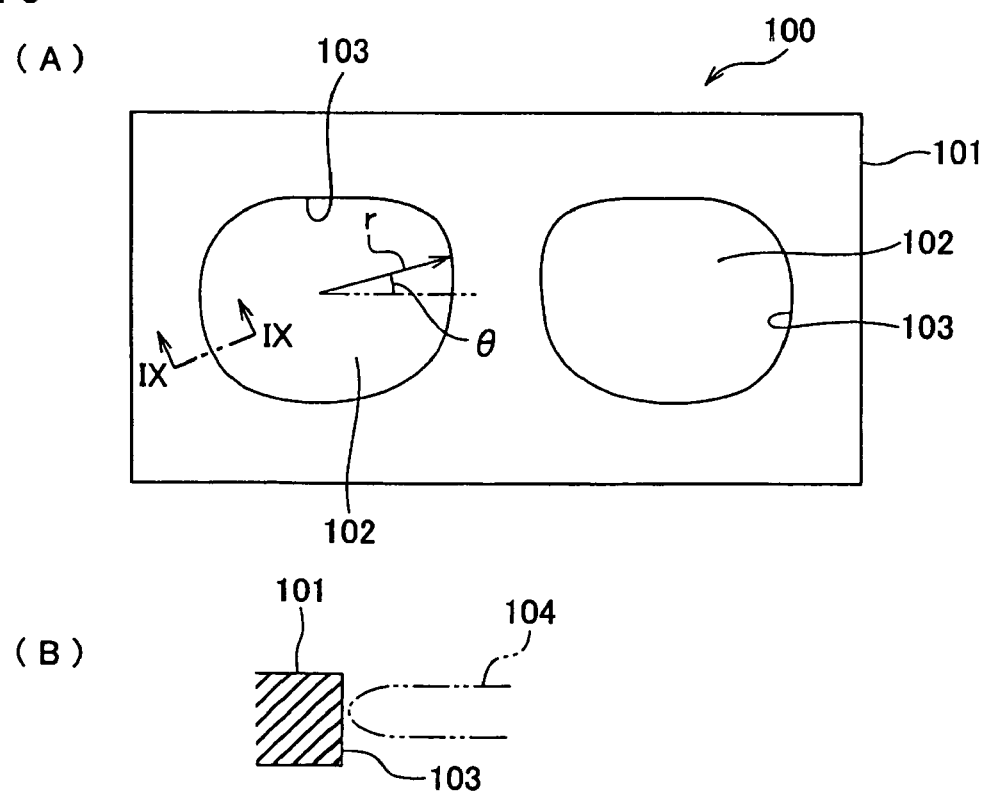
FIG. 9 shows a conventional calibration jig.

FIGS. 7 and 8

FIG. 7 shows a second embodiment of the calibration jig according to the present invention for a spectacle frame shape measuring apparatus; FIG. 7(A) is a front view, FIG. 7(B) is a view from the direction of arrow B in FIG. 7(A), and FIG. 7(C) is a view from the direction of arrow C in FIG. 7(A). Those components of the second embodiment which are similar to the components of the first embodiment are given the same reference numerals to omit their descriptions.

A calibration jig 50 shown in FIG. 7 has a plate-like body 51 made of a synthetic resin or a metal having two holes 52 and 53 provided side by side, with trace grooves 54 formed in the inner circumferential surfaces of the holes 52 and 53. The outer diameter of the plate-like body 51 has a rectangular shape.

The holes 52 and 53 are formed to have a circular shape, or the planary shape of rims 2A and 2B of a spectacle frame 1. The trace groove 54 has a displacement r in the radial direction (FIG. 7(A)), a displacement θ in the rotational direction (FIG. 7(A)), and a displacement z in the height direction (FIG. 7(B)). These displacements r, θ, and z are measured in advance by a predetermined number of times (N) per revolution at a given angular interval by such as an accurate spectacle frame shape measuring apparatus 10. The three-dimensional measurement data $(r_n, θ_n, z_n)$ (n=1, 2, 3, ..., N) is then used as a reference value. The circumferential length of the trace groove 54 calculated from the reference value is displayed as a reference circumferential length on the plate-like body 51 of the calibration jig 50. In this embodiment, the reference circumferential lengths of the trace grooves 54 of the holes 52 and 53 are displayed as "L circumferential length" and "R circumferential length," respectively.

Note that, in this embodiment, portions of the plate-like body which respectively lie above the holes 52 and 53 are defined as L circumferential length and R circumferential length display areas 43, respectively.

In addition, as shown in FIG. 8, the trace groove 54 is an outward recessed groove and has substantially opposite inclined surfaces 55A and 55B at a predetermined angle β. Substantially opposite portions 40A and 40B of the tip portion of the stylus 19 of the spectacle frame shape measuring apparatus 10 respectively contact these inclined surfaces 55A and 55B. Therefore, when the tip portion of the stylus 19 traces the tracing groove 54, the tip portion of the stylus 19 contacts both of the inclined surfaces 55A, 55B of the trace groove 54 and then is regulated, thus preventing the stylus 19 from disengaging from the trace groove 54.

The calibration jig 50 configured as described above is mounted on the spectacle frame shape measuring apparatus 10 being a measurement object in the same way as in the case of the calibration jig 30. In this calibration jig 50, a portion held by the clamp pins 16 is the upper and lower outer portions of the plate-like body 51.

Then, as the stylus 19 of the spectacle frame shape measuring apparatus 10 being a measurement object traces the trace grooves 54 in the holes 52 and 53 of the calibration jig 50, the three-dimensional displacements r, θ, and z of the trace grooves 54 are measured by a predetermined number of times (N) per revolution at a given angular interval. The circumferential lengths of the trace grooves 54 on the holes 52 and 53 are calculated and measured from the three-dimensional measurement data $(r_n, θ_n, z_n)$ (n=1, 2, 3, ..., N). The spectacle frame shape measuring apparatus 10 being a measurement object is adjusted so as to eliminate the difference between the measured circumferential lengths of the trace grooves 54 and the reference circumferential length, thereby effecting calibration of the spectacle frame shape measuring apparatus 10.

Therefore, the calibration jig 50 according to the second embodiment demonstrates an advantage similar to the advantage (3) brought about by the calibration jig 30 in addition to the following advantage (5).

(5) The trace grooves 54 traced by the stylus 19 of the spectacle frame shape measuring apparatus 10 are formed in the calibration jig 50, with the displacement r in the radial direction, the displacement θ in the rotational direction, and the displacement z in the height direction.

This makes it possible to carry out three-dimensional calibration of measurement errors of the spectacle frame shape measuring apparatus 10 by the calibration jig 50, thus achieving accurate calibration.

[C] Third Embodiment

Figure 10:
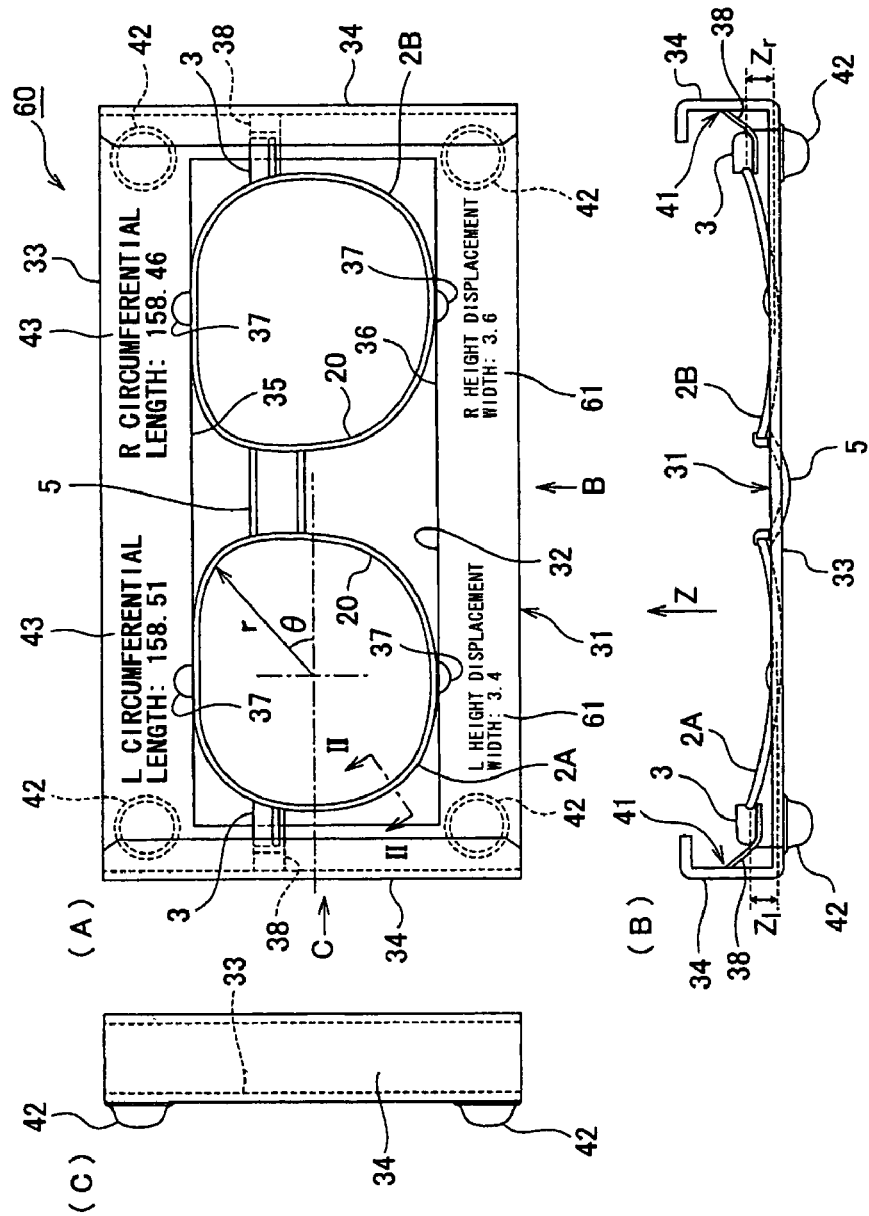
FIG. 10 shows a third embodiment of a calibration jig according to the present invention for a spectacle frame shape measuring apparatus.
Figure 11:
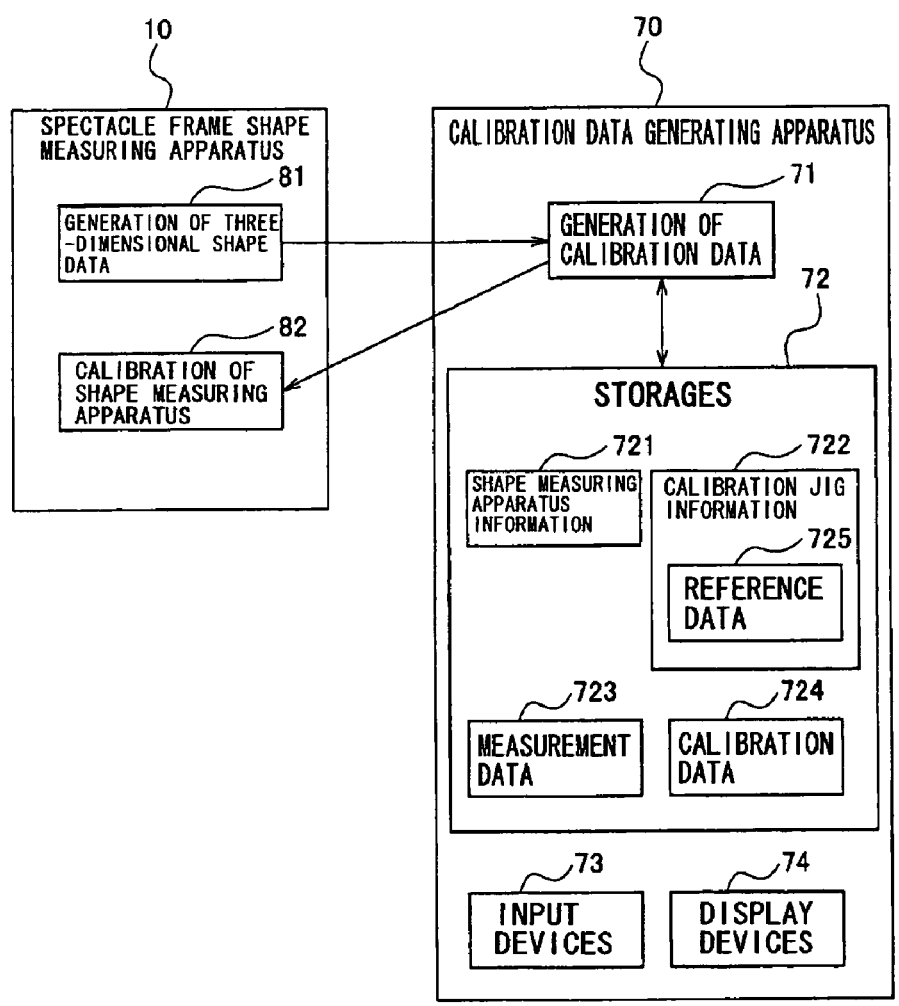
FIG. 11 is a block diagram showing an apparatus for calibrating a spectacle frame shape measuring apparatus by the calibration jig according to the present invention.
Figure 12:
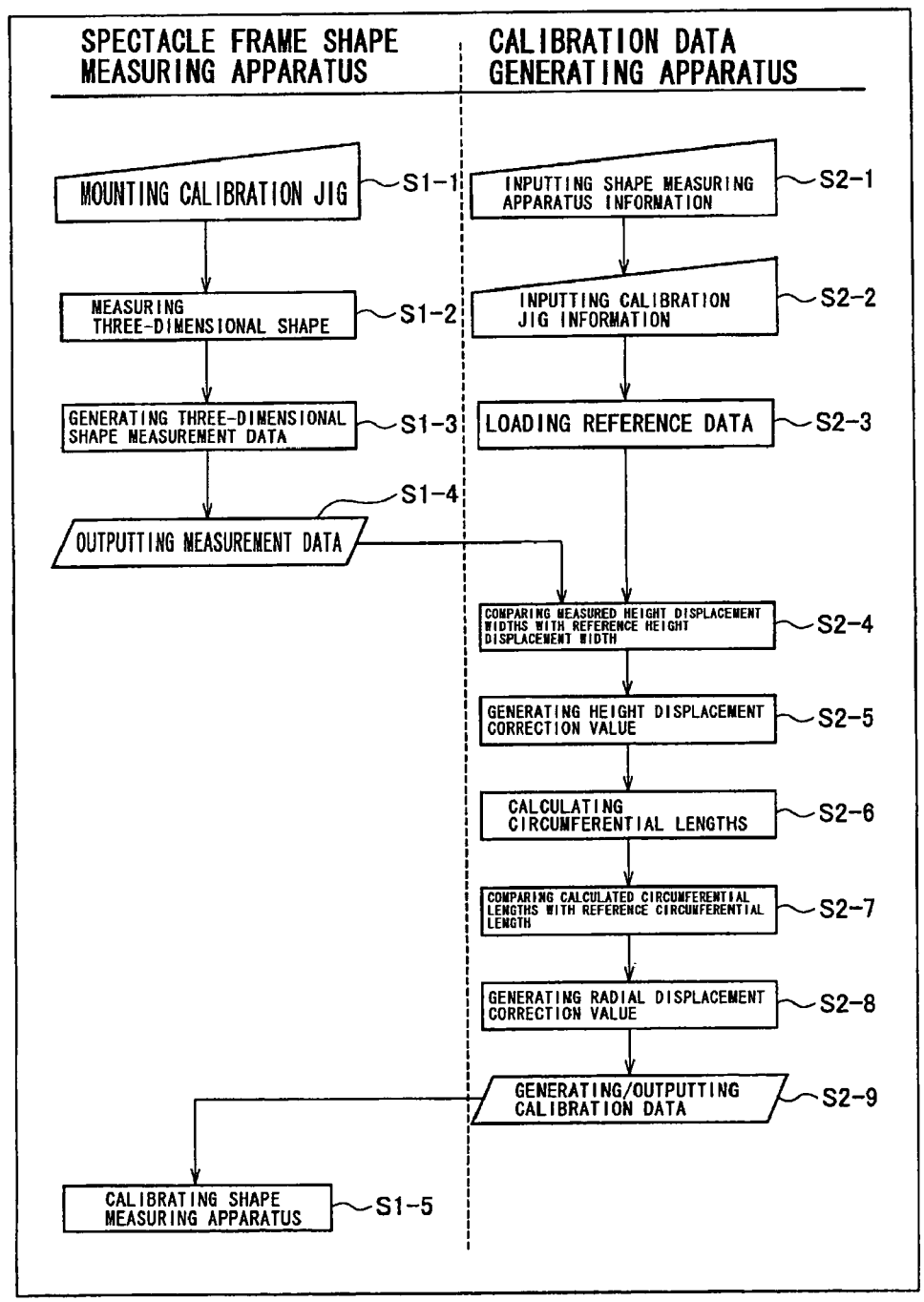
FIG. 12 is a flowchart illustrating a method for calibrating a spectacle frame shape measuring apparatus by the calibration jig according to the present invention.

FIGS. 10 to 12

The following illustrates a third embodiment which includes examples of a method for calibrating measurement errors of a spectacle frame shape measuring apparatus by a calibration jig according to the present invention and a calibration system using this calibration method.

FIG. 10 shows a calibration jig used in the third embodiment; FIG. 10(A) is a front view, FIG. 10(B) is a view from the direction of arrow B in FIG. 10(A), and FIG. 10(C) is a view from the direction of arrow C in FIG. 10(A).

Because a calibration jig 60 shown in FIG. 10 is identical to that of the first embodiment, except that the value of the height displacement width based on a reference value is displayed on a planar face 33, those components of the third embodiment which are similar to the components of the first embodiment are given the same reference numerals to omit their descriptions.

The term "reference height displacement width" herein represents a difference between the highest and lowest positions of a displacement z in the height direction (Zr and Zl in FIG. 10) within the reference values of the calibration jig 60 (three-dimensional data $(r_n, \theta_n, z_n)$ (n=1, 2, 3, . . . , N) expressed by a displacement r in the radial direction, a displacement $\theta$ in the rotational direction, and the displacement z in the height direction) measured in advance by the accurate spectacle frame shape measuring apparatus 10 or the like. In this embodiment, the reference height displacement widths of frame grooves 20 of rims 2A and 2B are displayed on the planar face 33 as "L height displacement width" and "R height displacement width," respectively. Note that, in this embodiment, portions of the planar face 33 which respectively lie under the rims 2A and 2B are defined as L height displacement width and R height displacement width display areas 61, respectively.

FIG. 11 is a block diagram showing a calibration system that automatically calibrates a spectacle frame shape measuring apparatus by the calibration jig according to the present invention.

This calibration system has a spectacle frame shape measuring apparatus 10 and a calibration data generating apparatus 70 which generates calibration data to control the calibration of measurement errors caused by this spectacle frame shape measuring apparatus 10. The spectacle frame shape measuring apparatus 10 and the calibration data generating apparatus 70 are connected so as to enable data transmission and reception.

Besides the configuration described in the description of the first embodiment, the spectacle frame shape measuring apparatus 10 has a three-dimensional shape data generating function 81 for generating three-dimensional shape data obtained by measuring the frame shape of a calibration jig 30 and transmitting the data to the calibration data generating apparatus 70, and a shape measuring apparatus calibration function for receiving the calibration data generated by the calibration data generating apparatus 70 and calibrating the apparatus based on the received calibration data.

The calibration data generating apparatus 70 includes a computer having a processing unit such as a CPU, and a storage unit 72 such as a memory or a hard disk, and is connected with input means such as a keyboard, a mouse or a barcode reader, and display means such as a CRT or a liquid crystal display.

A program for generating calibration data and data needed for generating the calibration data are stored in the storage unit 72. The data needed for generating the calibration data includes, for example, information 721 on the spectacle frame shape measuring apparatus being a calibration object (identification information, product name, model number, the type of the stylus, measurement conditions, etc.) and information 722 on the calibration jig to be used in calibration (identification information, model type, material, reference data 725, conditions for measuring reference values, etc.), and is stored in such a way as to be readable by those identification information, etc. as keys. The reference data 725 includes reference three-dimensional shape measurement data measured in advance by an accurate spectacle frame shape measuring apparatus, reference circumferential lengths, reference height displacement widths, and so forth. Further, three-dimensional shape measurement data 723 of the calibration jig 30 transmitted from the spectacle frame shape measuring apparatus 10 and calibration data 724 generated by the calibration data generating apparatus 70 are also stored in the storage unit 72.

Also, the calibration data generating apparatus 70 has a calibration data generating function 71 provided by executing the calibration data generating program described above.

When there are a plurality of spectacle frame shape measuring apparatuses being a calibration object and/or a plurality of calibration jigs, the shape measuring apparatus information and the calibration jig information may be stored for each of the spectacle frame shape measuring apparatuses and/or the calibration jigs.

The calibration data generating function 71 has a function of generating calibration data based on the measurement data on the calibration jig transmitted from the spectacle frame shape measuring apparatus 10 and the reference data on the calibration jig stored in the storage unit, as well as a function of transmitting the generated calibration data to the spectacle frame shape measuring apparatus.

Next, a method of calibrating the spectacle frame shape measuring apparatus 10 by the calibration data generating apparatus 70 is described with reference to the flowchart shown in FIG. 12.

In FIG. 12, the left-hand side of the flowchart shows processes and operations which are performed by the spectacle frame shape measuring apparatus 10 (Steps S1-1 to S1-5), whereas the right-hand side of the flowchart shows processes and operations which are performed by the calibration data generating apparatus 70 (Steps S2-1 to S2-9).

(Step S2-1)

First, in the calibration data generating apparatus 70, the program for the calibration process is activated, and identification information for specifying the spectacle frame shape measuring apparatus to be calibrated is input with the input means in accordance with an operational screen displayed. Note that when the spectacle frame shape measuring apparatus to be calibrated is prespecified, this step may be omitted.

(Step S2-2)

Identification information for specifying the calibration jig used in calibration is also input with the input means 73 in accordance with the operational screen displayed. In addition, instead of inputting the identification information, reference data such as reference circumference lengths and reference height displacement widths, may be directly input, thereby stored in the storage unit 72.

(Step S2-3)

The calibration data generating apparatus 70 stands by to receive measurement data transmitted from the spectacle frame shape measuring apparatus 10 specified in the Step S2-1. The reference data 725 on the calibration jig stored in advance in the storage unit 72 is read based on the calibration jig identification information input in the Step S2-2. The reference data 725 to be read here is data including reference circumferential lengths and reference height displacement widths. Also in reading the reference data 725 on the calibration jig, when the reference data 725 to be used by the spectacle frame shape measuring apparatus differs, for example, the reference data to be used may be read on the basis of the calibration jig identification information and the spectacle frame shape measuring apparatus identification information input in the S2-1.

(Step S1-1)

Meanwhile, in the spectacle frame shape measuring apparatus 10, the operator mounts the calibration jig 60 on the spectacle frame shape measuring apparatus 10 in the manner described in the description of the first embodiment.

(Step S1-2)

The operator operates the control panel 11 of the spectacle frame shape measuring apparatus 10 to initiate three-dimensional measurement of the frame shape of the mounted calibration jig 60.

(Step S1-3)

The results of measuring the left and right frame shapes of the calibration jig 60 are generated by the three-dimensional shape data generating function 81 in the form of three-dimensional shape measurement data, being cylindrical coordinate values $(r_n, \theta_n, z_n)$ ($n=1, 2, 3, \ldots, N$).

(Step S1-4)

The generated three-dimensional shape measurement data is transmitted to the calibration data generating apparatus 70 by the three-dimensional shape data generating function 81.

(Step S2-4)

When the calibration data generating apparatus 70 receives the three-dimensional shape data from the spectacle frame shape measuring apparatus 10, the calibration data generating function 71 of the calibration data generating apparatus 70 stores the data in the storage unit 72, calculates the height displacement widths Zr and Z1 (hereinafter, also called "measured height displacement widths"), namely the differences between the highest value (maximum value) and lowest value (minimum value) of the displacement $z_n$ of the measurement data, and compares the height displacement widths with the reference height displacement width read in the Step S2-3.

(Step S2-5)

When the measured height displacement width does not coincide with the reference height displacement width, a correction value for correcting the measured height displacement width so as to coincide with the reference height displacement width is generated and stored in the storage unit 72. This correction value in use can be, for example, the ratio between the reference height displacement width and the measured height displacement width. Then, the generated calibration value is used to correct the height displacements $z_n$ ($n=1, 2, 3, \ldots, N$) of the measurement data.

Specifically, when the measured height displacement width is 3.5 mm against the reference height displacement width of 3.6 mm, for example, 1.03 being the ratio of the reference height displacement width to the measured height displacement width, is set as the correction value. Then, the distance of each of the height displacements $z_n$ from the minimum height displacement is multiplied by the correction value to correct each height displacement $z_n$, then stored in the storage unit 72.

(Step S2-6)

Next, the circumferential lengths are calculated based on the measurement data having the height displacements $z_n$ corrected in the Step S2-5.

(Step S2-7)

The circumferential lengths calculated in the Step S2-6 are compared with the reference circumferential length to acquire the difference therebetween.

(Step S2-8)

When there is some difference, a correction value for correcting the radial displacement r is generated in such a way as to eliminate the difference and stored in the storage unit 72. For example, the correction value can be the same ratio which is used to correct all of the radial displacements $r_n$ ($n=1, 2, 3, \ldots, N$) so that the circumferential lengths coincide with the reference circumferential length.

(Step S2-9)

Calibration data for calibrating the spectacle frame shape measuring apparatus is generated based on the height displacement width correction value generated in Step S2-5 and the radial displacement correction value generated in Step S2-8, stored in the storage unit 72, and transmitted to the spectacle frame shape measuring apparatus 10.

(Step S1-5)

Upon reception of the calibration data from the calibration data generating apparatus 70, the spectacle frame shape measuring apparatus 10 calibrates the shape measuring apparatus in accordance with the calibration data by the shape measuring apparatus calibrating function 82.

Calibration using the method and apparatus described above makes it easy to effect three-dimensional calibration of measurement errors caused by the spectacle frame shape measuring apparatus 10 by the calibration jig according to the present invention.

Although the foregoing description of the third embodiment has been given of the case of the calibration system which has the spectacle frame shape measuring apparatus 10 and the calibration data generating apparatus 70 as separate apparatuses, the function of the calibration data generating apparatus 70 may be incorporated in the spectacle frame shape measuring apparatus 10 so that calibration can be carried out on the spectacle frame shape measuring apparatus.

In addition, a plurality of spectacle frame shape measuring apparatuses may be connected to the calibration data generating apparatus 70 so that a single calibration data generating apparatus generates calibration data for a plurality of spectacle frame shape measuring apparatuses. In this case, shape measurement apparatus information 721 to be stored in the storage unit may be stored for each of the measurement apparatuses, and the measuring apparatus to be calibrated may be selected to read necessary information. In this case, the spectacle frame shape measuring apparatuses and the calibration data generating apparatus may be connected together over a network, such as LAN.

The function of the calibration data generating apparatus may be dispersed into a plurality of devices connected together.

The present invention has been described referring to the first to third embodiments, which are not restrictive.

REFERENCE NUMERALS

1 Spectacle frame
2A, 2B Rim
3 Endpiece
10 Spectacle frame shape measuring apparatus
19 Stylus (measuring probe)
20 Frame groove (trace groove)
39 Calibration jig
31 Frame body
32 Opening
33 Planar face 34 Upright portion
35 Upper edge
36 Lower edge
39A, 39B Inclined surface (regulating surface)
50 Calibration jig
51 Plate-like body
52, 53 Hole
54 Trace groove
r Displacement in the radial direction
θ Displacement in the rotational direction
z Displacement in the height direction

The invention claimed is:

1. A calibration jig that is used as a calibration standard for calibrating measurement errors in a radial direction, a rotational direction, and a height direction of a spectacle frame shape measuring apparatus that measures a shape of a spectacle frame by a measuring probe, the calibration jig comprising:
    a trace groove that is formed three-dimensionally on the jig and defining a three-dimensional shape having displacement, at a given position along the groove, in the radial direction, the rotational direction, and the height direction with respect to a reference position, and is configured to be traced by the measuring probe.

2. The calibration jig according to claim 1, wherein the trace groove is formed in an inner circumferential surface of a hole formed in a plate-like body.

3. The calibration jig according to claim 2, wherein the trace groove has regulating surfaces regulating a tip portion of the measuring probe by contacting both substantially opposite portions of the tip portion of the measuring probe with the trace groove.

4. The calibration jig according to claim 1, wherein the trace groove is formed in an inner circumference of a rim, and the rim is secured to a frame body having rigidity higher than that of the rim.

5. The calibration jig according to claim 4, wherein the frame body has a planar face having an opening provided correspondingly to a pair of rims and upright portions disposed upright from both sides of the planar face, an upper portion and a lower portion of the rim are adhered to edge portions facing the opening of the planar face, and endpieces of the rims are adhered to the respective upright portions.

6. The calibration jig according to claim 5, wherein the trace groove has regulating surfaces regulating a tip portion of the measuring probe by contacting both substantially opposite portions of the tip portion of the measuring probe with the trace groove.

7. The calibration jig according to claim 4, wherein the trace groove has regulating surfaces regulating a tip portion of the measuring probe by contacting both substantially opposite portions of the tip portion of the measuring probe with the trace groove.

8. The calibration jig according to claim 1, wherein the trace groove has regulating surfaces regulating a tip portion of the measuring probe by contacting both substantially opposite portions of the tip portion of the measuring probe with the trace groove.

9. The calibration jig according to claim 1, wherein reference values corresponding to the displacement of the three-dimensional shape in each of the radial direction, the rotational direction, and the height direction are premeasured, and the reference values are usable to calibrate the measurement error.

10. The calibration jig according to claim 1, wherein reference values corresponding to the displacement of the three-dimensional shape in each of the radial direction, the rotational direction, and the height direction are premeasured, and the reference values are used to calculate a reference height displacement width, and the reference height displacement width is useable to calibrate the measurement error.

11. The calibration jig according to claim 10, wherein the reference values are used to calculate a reference circumferential length, and the reference circumferential length is useable to calibrate the measurement error.

12. The calibration jig according to claim 11, wherein the reference circumferential length is displayed on the calibration jig.

13. The calibration jig according to claim 11, wherein the reference height displacement width is displayed on the calibration jig.

14. A calibration method using a calibration jig that is used as a calibration standard for calibrating measurement errors in a radial direction, a rotational direction, and a height direction of a spectacle frame shape measuring apparatus that measures a shape of a spectacle frame by a measuring probe, the calibration jig having a trace groove that is formed three-dimensionally in the radial direction, the rotational direction, and the height direction, and is configured to be traced by the measuring probe, the calibration method comprising steps of:
    measuring a three-dimensional shape of the trace groove by tracing the trace groove with the measuring probe kept in contact with the trace groove;
    calculating a correction value for correcting a height displacement of three-dimensional shape data so that a height displacement width calculated based on the three-dimensional shape data obtained by measurement coincides with a reference height displacement width determined based on reference three-dimensional shape data obtained by measuring the trace groove in advance;
    calculating a circumferential length of the trace groove based on the three-dimensional shape data which includes the height displacement corrected by the calculated height displacement correction value;
    calculating a correction value for correcting a radial displacement of the three-dimensional shape data which includes the height displacement corrected so that the calculated circumferential length coincides with a reference circumferential length that is determined based on the reference three-dimensional shape data; and
    calibrating a measurement error of the spectacle frame shape measuring apparatus based on the height displacement correction value and the radial displacement correction value.

15. The calibration method according to claim 14,
    wherein the trace groove has regulating surfaces regulating a tip portion of the measuring probe by contacting both substantially opposite portions of the tip portion of the measuring probe with the trace groove.

16. A calibration data generating apparatus using a calibration jig that is used as a calibration standard for generating calibration data for calibrating measurement errors in a radial direction, a rotational direction, and a height direction of a spectacle frame shape measuring apparatus that measures a shape of a spectacle frame by a measuring probe, the calibration jig having a trace groove that is formed three-dimensionally in the radial direction, the rotational direction, and the height direction, and is configured to be traced by the measuring probe, the calibration data generating apparatus comprising:
    a first correction value calculating part for calculating a correction value for correcting a height displacement of three-dimensional shape data that is obtained by measuring a three-dimensional shape of the trace groove by tracing the trace groove with the measuring probe, the height displacement being corrected so that a height displacement width calculated based on the three-dimensional shape data coincides with a reference height displacement width determined based on reference three-dimensional shape data obtained by measuring the trace groove in advance;

a circumferential length calculating part for calculating a circumferential length of the trace groove based on three-dimensional shape data which includes the height displacement corrected by the calculated height displacement correction value;

a second correction value calculating part for calculating a correction value for correcting a radial displacement of the three-dimensional shape data which includes the height displacement corrected so that the calculated circumferential length coincides with a reference circumferential length that is determined based on the reference three-dimensional shape data; and a calibration data generating part for generating calibration data for calibrating a measurement error of the spectacle frame shape measuring apparatus based on the height displacement correction value and the radial displacement correction value.

17. The calibration data generating apparatus according to claim 16, wherein the trace groove has regulating surfaces regulating a tip portion of the measuring probe by contacting both substantially opposite portions of the tip portion of the measuring probe with the trace groove.

18. A spectacle frame shape measuring apparatus comprising:

a spectacle frame shape measuring part measuring a shape of a spectacle frame by a measuring probe; and a calibration data generating part for generating calibration data for calibrating measurement errors in a radial direction, a rotational direction, and a height direction of the spectacle frame shape measuring part, by using a calibration jig that is used as a calibration standard for calibrating the measurement errors, wherein the calibration jig has a trace groove that is formed three-dimensionally in the radial direction, the rotational direction, and the height direction, and is configured to be traced by the measuring probe; and wherein the calibration data generating part comprises:

a first correction value calculating part for calculating a correction value for correcting a height displacement of three-dimensional shape data that is obtained by measuring a three-dimensional shape of the trace groove by tracing the trace groove with the measuring probe, the height displacement being corrected so that a height displacement width calculated based on the three-dimensional shape data coincides with a reference height displacement width determined based on reference three-dimensional shape data obtained by measuring the trace groove in advance;

a circumferential length calculating part for calculating a circumferential length of the trace groove based on three-dimensional shape data which includes the height displacement corrected by the calculated height displacement correction value;

a second correction value calculating part for calculating a correction value for correcting a radial displacement of the three-dimensional shape data which includes the height displacement corrected so that the calculated circumferential length coincides with a reference circumferential length that is determined based on the reference three-dimensional shape data; and a calibration data generating part for generating calibration data for calibrating a measurement error of the spectacle frame shape measuring apparatus based on the height displacement correction value and the radial displacement correction value.

19. The spectacle frame shape measuring apparatus according to claim 18, wherein the trace groove has regulating surfaces regulating a tip portion of the measuring probe by contacting both substantially opposite portions of the tip portion of the measuring probe with the trace groove.

20. A spectacle frame shape measuring calibrating system comprising:

a spectacle frame shape measuring apparatus measuring a shape of a spectacle frame by a measuring probe; and a calibration data generating apparatus for generating calibration data for calibrating measurement errors in a radial direction, a rotational direction, and a height direction of the spectacle frame shape measuring part, by using a calibration jig that is used as a calibration standard for calibrating the measurement errors, wherein the calibration jig has a trace groove that is formed three-dimensionally in the radial direction, the rotational direction, and the height direction, and is configured to be traced by the measuring probe; and wherein the calibration data generating apparatus comprises:

a first correction value calculating part for calculating a correction value for correcting a height displacement in three-dimensional shape data that is obtained by measuring a three-dimensional shape of the trace groove by tracing the trace groove with the measuring probe, the height displacement being corrected so that a height displacement width calculated based on the three-dimensional shape data coincides with a reference height displacement width determined based on reference three-dimensional shape data obtained by measuring the trace groove in advance;

a circumferential length calculating part for calculating a circumferential length of the trace groove based on three-dimensional shape data which includes the height displacement corrected by the calculated height displacement correction value;

a second correction value calculating part for calculating a correction value for correcting a radial displacement of the three-dimensional shape data which includes the height displacement corrected so that the calculated circumferential length coincides with a reference circumferential length that is determined based on the reference three-dimensional shape data; and a calibration data generating part for generating calibration data for calibrating a measurement error of the spectacle frame shape measuring apparatus based on the height displacement correction value and the radial displacement correction value.

21. The spectacle frame shape measuring calibrating system according to claim 20, wherein the trace groove has regulating surfaces regulating a tip portion of the measuring probe by contacting both substantially opposite portions of the tip portion of the measuring probe with the trace groove.

* * * * *